Jan. 10, 1956   CARL-ERIK GRANQVIST   2,730,716
CONTROL APPARATUS FOR DIRECTION FINDER

Filed Aug. 27, 1952   3 Sheets-Sheet 1

Jan. 10, 1956   CARL-ERIK GRANQVIST   2,730,716
CONTROL APPARATUS FOR DIRECTION FINDER
Filed Aug. 27, 1952   3 Sheets-Sheet 2

United States Patent Office 2,730,716
Patented Jan. 10, 1956

2,730,716

CONTROL APPARATUS FOR DIRECTION FINDER

Carl-Erik Granqvist, Lidingo, Sweden, assignor to Hazeltine Research, Inc., Chicago, Ill., a corporation of Illinois Application August 27, 1952, Serial No. 306,597

Claims priority, application Sweden September 1, 1951

12 Claims. (Cl. 343—118)

General

Automatic radio direction finding is as a rule produced by bringing a directional receiver antenna system into rotation at a constant speed, the antenna system being connected to a receiver in such a way that a pulse is translated to an indicator, for instance a cathode ray valve, when energy such as a continuous wave carrier-frequency wave signal radiated from a transmitter at a remote point is received by the antenna system, an indication of the direction of the input wave being obtained in said cathode ray valve.

It is difficult to provide antenna systems with a high direction finding accuracy. If, however, one should succeed in providing an antenna system with such a high direction finding sharpness that one may read the direction of the input wave with a high degree of accuracy, then the total energy present during the reception time of the wave will be very small and disturbances may to a too high degree influence the direction finding result. Consequently no essential or effective increase of the direction sharpness is obtained. Regarding the desire for a high energy quantity in the pulse, the pulse should therefore have a certain width, but this width, in turn, only allows for decrease in reading accuracy.

For explaining the present invention the concept of mean pulse time is now introduced. The mean pulse time is counted or measured from a given moment, for instance from the moment when the maximum pulse intensity should be obtained, for example from the moment when the direction of the input or received wave had been north-south, or from the moment when the direction of the input wave had corresponded to the longitudinal ship direction of the vessel or some other arbitrarily chosen moment. The mean pulse time is counted from that chosen moment to the moment of time when half the pulse has passed, it being assumed that the received pulse applied to the indicating device, as is usually the case, has image symmetrical flanges or skirt portions, so that the middle point of the pulse will therefore correspond to its highest intensity, and will be representative of the direction to be found.

The present invention relates to an arrangement for marking in the indicator the mean pulse time in such a way that with very high degree of sharpness the direction of the input or received beam can be read.

In accordance wih a particular form of the invention, a control apparatus for deriving an effect representative of the middle of the duration of a pulse which may be unsymmetrical comprises a first control system responsive to the pulse for deriving at a predetermined rate a first control effect representative of the duration of the pulse. The control apparatus also includes a second control system coupled to the first system and effectively responsive to a portion of the pulse for deriving at a rate substantially greater than the aforesaid predetermined rate a second control effect. The control apparatus further includes signal-developing means coupled to the second system and effectively responsive to the aforesaid control effects for terminating the second control effect and developing at that termination a third control effect representative of a time interval of fixed duration between another portion of the pulse and a time thereafter. The control apparatus additionally includes a circuit for applying the third control effect to an indicating device to produce an indication of the middle of the pulse.

For a better understanding of the present invention, together with other and further objects thereof, references is had to the following description taken in connection with the accompanying drawings, and its scope will be pointed out in the appended claims.

Dependent upon what kind of a system is used for the direction finding, the pulse may either be negative, i. e. one performs the direction finding on a pronounced minimum of radiation, or it may be positive, i. e. one accomplishes the direction finding on a pronounced maximum of radiation. Which of the two is the case is without importance for this invention since it can be practical in both cases. The invention is, however, below described in connection with a system for direction finding intended for direction finding on a maximum of voltage of the input, received signal.

Figure 3:
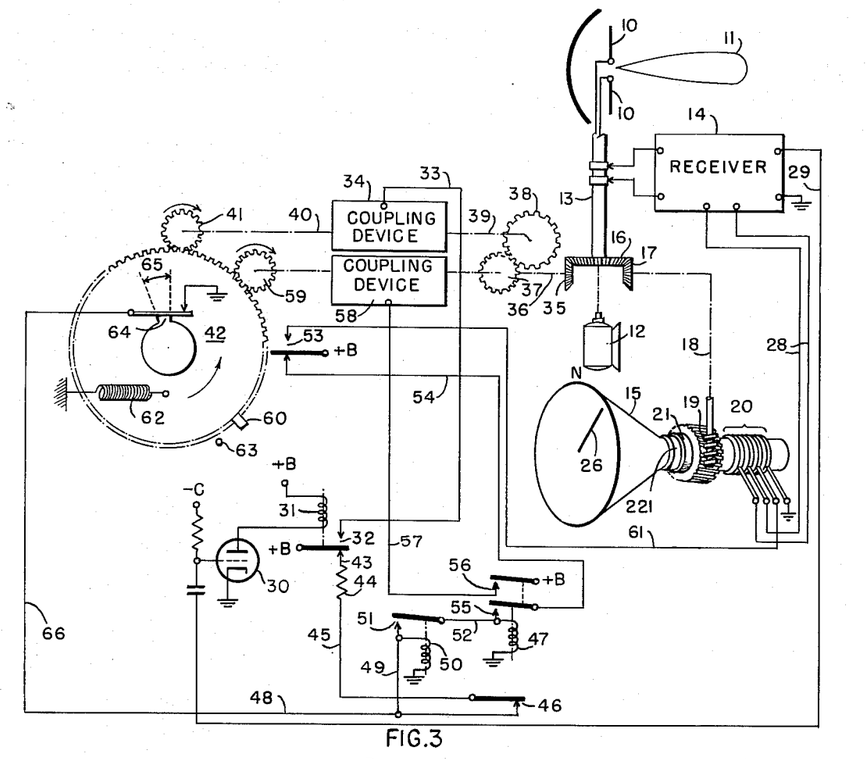
Fig. 3 represents a mechanically driven embodiment of the invention, and Figs. 4, 5 and 6 indicate different variations of electrical forms of the invention.

Description and operation of Fig. 3 system

Referring to Fig. 3, the radiation characteristic of the antenna system 10 is schematically indicated by the lobe 11. It is assumed that the antenna system is mechanically rotated by a motor 12 driving a shaft 13. The lead-in from the antenna system is further assumed to be connected to a receiver 14 which is in turn connected to a cathode ray valve 15 so that there may be obtained on the screen of the cathode ray valve, if desired, a picture of the radiation characteristic. The angular position of this picture indicates the direction of the input wave. The rotation of the field in the cathode ray valve can be obtained in any well-known manner, for instance from the shaft 13 by means of a cog gearing containing the cog wheels 16 and 17, the latter one of which drives a shaft 18, which in turn by means of driving wheel 19 places the deflection means or yoke 221 of the cathode ray valve in rotation synchronously and in a fixed angular relation to the rotation of the antenna system. The conventional deflection or deviation means 221 may be connected to the output circuit of the receiver 14 through contact rings in a set 20 of contact rings and this set of contact rings also contains other contact rings, which are connected to a specific radial deflection or deviation means 21 for use in diplaying a pulse according to the present invention.

When it is said here, that this deviation means transfers a pulse according to the present invention, it should be understood that this is only one possibility amongst a plurality of the possibilities for executing the invention which may be thought of within the frame of the invention. Thus, one may instead of influencing the specific deviation means influence some other part, controlling the beam of the cathode ray valve, for instance a control grid, or even the normal deviation means for providing a rotation of the beam in the cathode ray valve. It is of no decisive importance to the present invention, how this part of the invention is made.

Figure 1:
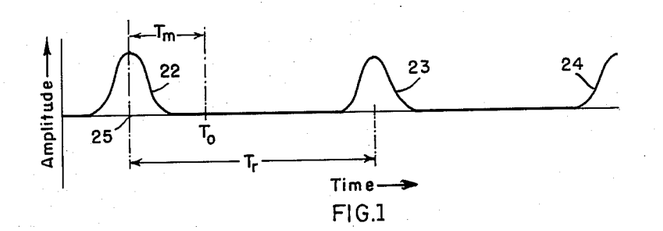
Fig. 1 is a diagram for explaining the concept of mean pulse time.

In Fig. 1, the pulses 22, 23, 24 and so on are shown in a linear time diagram, which are assumed to be received by means of the above described arrangement, which is known per se. The rotation time of the antenna system is indicated $T_r$, which means that the antenna system, which is assumed to be of such a kind that only one pulse is obtained per turn, is completing a rotation of one turn during the time $T_r$. The fixed or reference moment of time is assumed to be that one which is indicated in the diagram by $T_0$, and in the specific case the mean pulse time is therefore that one, which is indicated $T_m$. It is the point 25 of the mean pulse time $T_m$, which should according to the invention be marked by high degree of precision. In Fig. 3 this point is indicated by means of a line 26 on the screen of the cathode ray valve.

Figure 2:
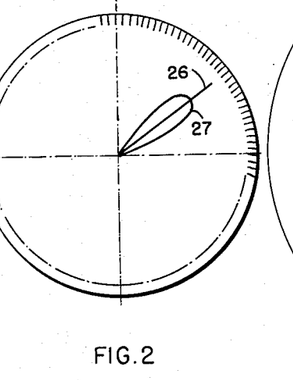
Fig. 2 is a picture of an indicated pulse as might be displayed on a cathode ray valve.

In Fig. 2 there is shown by means of a circle the circumference of the screen of the cathode ray valve, as well as a scale indicated on said screen for reading the direction of the input beam. Further there is shown the lobe 27 corresponding to the directional characteristic, and the line 26. It is immediately seen, that the precision in reading the direction of the transmission exclusively by means of the lobe 27 will be difficult and in many cases insufficient, whereas, on the other hand, the reading of the transmission direction by means of the line 26 will give a very good result. As a matter of fact one need not, in the above described arrangement according to Fig. 3, reproduce the finding lobe of the input signal, if, according to this invention, the mean pulse time is reproduced by means of a line 26, because the reproduction of this line is fully sufficient to afford a good reading. One may therefore in executing the invention leave out the connection line 28 between the receiver 14 and the deflecting means 221 of the cathode ray indicator 15.

Figure 2A:
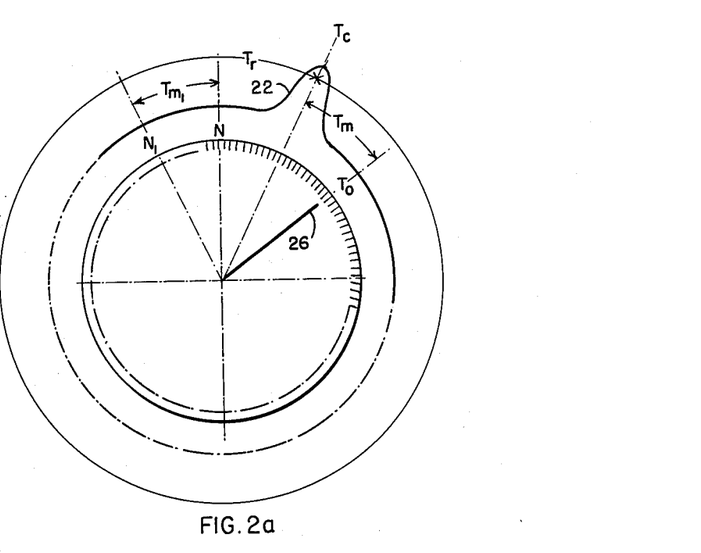
Fig. 2a is a representation used in explaining the principle of the invention.

The inner circle of Fig. 2a and the graduations thereon also represent the screen and the azimuth scale of the cathode-ray valve, and the line 26 traced on that screen indicates the direction of the transmitter located by the direction finder. A circular plot of the received pulse 22 of Fig. 1, together with the mean-pulse time $T_m$, the reference time $T_0$ which corresponds to the time a pulse representative of a received direction-finding pulse is displayed on the screen of the cathode-ray valve, and the time interval $T_r$ for a rotation of the direction-finding antenna appear around the circumference of the screen of the tube represented in Fig. 2a. The time $T_c$ represents the time when the center of a received pulse may actually occur during one rotation of the antenna system of the direction finder. The time $T_m$ is a fixed interval of time constituting a constant delay in the control apparatus of the present invention and represents the mean-pulse time, that is, a time measured from a given moment $T_0$ when the maximum pulse intensity is indicated by line 26 to the moment $T_c$ when half the pulse has passed. In order to provide a correct indication of azimuth, the north compass point $N_1$ of the cathode-ray valve is displaced clockwise an amount equal to the angle $T_{m'}$ with reference to the rotary antenna system of the direction finder when that antenna system is pointing due north as represented by the point $N_1$ of Fig. 2a. The angle $T_{m'}$ is equal to the angle $T_m$.

Since the mean-pulse time $T_m$ of the control apparatus of the present invention is a constant and is accurately representative of the middle of a received direction-finding pulse, the line 26 traced on the screen of the cathode-ray valve gives an accurate indication of the direction of the source located by the direction finder.

According to the mechanically driven arrangement according to the invention, shown in Fig. 3, a conductor 29 runs from the receiver 14 to a rectifier 30, which is in the figure schematically indicated by means of a triode valve. In the anode circuit of this valve the pulse will consequently pass as a direct current pulse and influence the relay 31, which is very rapidly acting, so that it is practically immediately contacting or discontacting, respectively, at the leading and trailing edges, respectively, of an input pulse. It is now assumed that a pulse is transmitted through the conductor 29. The happenings in the arrangement caused by this pulse will now be followed.

At first, as mentioned above, the relay 31 is excited. In its magnetized condition, the upper contact 32 is closed and applies a positive voltage to the conductor 33, which runs to a magnet coupling device 34 of conventional construction. The driving shaft 39 for the magnet coupling device 34 is, driven by the motor 12 through a cog wheel 35, shaft 36 and cog wheels 37 and 38. The gear ratio of the cog wheels 37 and 38 is 1:2, and consequently the shaft 39 will rotate with only half of the turns of the shaft 13 (or possibly with a number of turns proportional to this half part). The driven shaft 40 of the magnet coupling device 34 in turn carries a cog wheel 41, which contacts the periphery of a disc 42, provided with a cog rack.

Considering these circumstances, the disc 42 will be kept in rotation with a number of turns, which is in a fixed proportionality relation to the half of the number of turns of the shaft 13. The rotation of the disc 42 will be continued exactly as long as the relay 31 is excited, that means for all of the duration of the pulse. Its rotation will therefore form a measure of the half width of the pulse.

When the pulse ceases, the relay 31 is de-excited. In this moment a circuit is closed from the lower contact 32 of the relay 31, which is provided with positive voltage, through conductor 43, a protection resistor 44, conductor 45, a normally closed contact 46 of a relay 47, conductors 48 and 49 as well as the winding of the relay 50 to ground. The relay 50 is momentarily excited, whereby the normally open contact 51 of relay 50 is closed and connected through conductor 52 and the winding of relay 47 to ground. Consequently relay 47 is magnetized, whereby this relay closes a holding circuit through a limit position switch 53 controlled by the disc 42 during its rotation, said switch being influenced by positive voltage through conductor 54 and the now closed contact 55. When the relay 47 is energized the normally closed contact 46 will open the circuit of the relay 50 so that this relay is demagnetized.

Finally, when the relay 47 is magnetized, its contact 56 is closed, whereby a positive voltage is applied to a circuit including conductor 57 and the magnet coupling device 58. The driving shaft of the magnet coupling device 58 is formed by the shaft 36, already mentioned, and no change of speed in the relation 1:2 occurs as far as regards this magnet coupling device. The disc 42 will now double its speed of rotation to a rotational speed, which is in the above mentioned fixed proportionality relation to the full number of turns of shaft 13 instead of to the half of said number of turns. From this it is evident, that the time, required for driving the disc 42 to a given distinct position, which will under all circumstances be farther away from the starting position than the duration of the pulse, or at least the half of this duration, will coincide with the mean pulse time, as this was defined above.

The limit position contact 53 is arranged to stop the rotation of the disc 42 when the mean pulse time has been reached. A shoulder 60 of the disc will then contact the influencing means of the limit position switch 53 whereby the contact is opened, which earlier transferred positive voltage to the conductor 54, and another contact is simultaneously closed so that positive voltage is transferred to the conductor 61. When the positive voltage feed to the conductor 54 ceased, the holding of the relay 47 also ceased so that this relay is demagnetized and the coupling device 58 becomes disengaged. When positive voltage was connected to the conductor 61, the specific deviation means 21 for providing a marking on the screen of the cathode ray valve 15 in the form of the radial line 26 is influenced over contact rings in the set of contact rings 20. This marking will last only for a very short moment so that the line 26 will be correspondingly narrow and consequently will give a very accurate reading. Immediately after the disc 42 has been made free from connection to the shaft 36 by the disengagement of the coupling 58, a spring 62, which is continuously tightened during the rotation of the disc 42, is effective to return the disc 42 into its initial position as shown in Fig. 3 in which the shoulder 60 contacts a fixed nail or stop 63.

It may be that the relay 31 tends to react without a desired or real pulse having been received, for instance due to a random, short atmospheric discharge or other disturbance comparable therewith. It is undesirable that such a random or short reaction should cause the above described cycle of reactions to be completed by the line 26 being indicated on the screen of the cathode ray valve. For this purpose the disc 42 is provided with a cam disc contact 64 of such an arc 65, that the cam disc contact will remain closed during the time for the normally occurring, short atmospheric discharges, but will be opened in good time before the ceasing of a pulse of normal duration.

As long as the pulse remains and the relay 31 as well as the coupling 34 are closed, the contact 64 will have no function. The disc therefore rotates in the manner described above. But, if the relay 31 should be demagnetized substantially earlier than what one could expect considering the normal duration of a pulse, that is before the cam disc contact 64 has been opened, this contact will connect ground to the conductor 45 over the conductor 66. The circuit runs from ground through the contact 64, the conductor 66, the conductor 48, the contact 46, the conductor 45, the protection resistor 44 and the demagnetized closed contact 32 of the relay 31 to the positive voltage terminal. Thereby the relays 50 and 47 are by-passed, so that these are not capable of being magnetized when the incorrect "pulse" is ceasing, and consequently the disc 42 will not continue its rotation but will immediately return to its initial position due to the action of the spring 62 and without the limit position contact 53 being influenced, and consequently without any indication of the type 26 being provided on the screen of the cathode ray valve.

From the foregoing description and explanation of the operation of the Fig. 3 direction finder, it will be seen that the components or units 15–21, inclusive, 30–15, inclusive, 55–64, inclusive, and 66 constitute a control apparatus for deriving an effect representative of the middle of a duration of a pulse such as that derived in the output circuit of the receiver 14 for each rotation of the antenna system 10. It will also be clear that the tube 30 with its input circuit and output circuit including relay winding 31, the upper relay contact 32, the magnetic coupling device 34 and its driving and driven members 12, 16, 36, 37, 38, 39, 40, and 41, and the rotatable disc 42 comprise a first control system responsive to the direction-finding pulse received by receiver 14 for deriving at a predetermined rate a first control effect representative of the duration of that pulse. This control effect may be considered to be the first angle through which the disc 42 is rotated when the clutching device 34 permits shaft 40 to be rotated at a speed half that of the antenna drive shaft 13.

The lower contact 32, the contact 46, the winding 50, contact 51, the relay winding 47, contact 55, the lower contact of the limit switch 53, and the electrical connections and the potential source connected thereto, the clutching device 58, gear 59, and disc 42 comprise a second control system coupled to the first control system identified above and effectively responsive to the trailing edge of the received pulse (coupling device 58 is closed by current flow through contact 56 at the termination of the pulse applied to the input circuit of tube 30) for deriving at a rate substantially twice said predetermined rate a second control effect. It will be recalled that coupling device 58 when energized causes disc 42 to rotate twice as fast as when coupling device 34 is energized. The second control effect may be considered to be the second angle through which the disc 42 is rotated when the clutching device 58 permits gear 59 to be rotated at a speed equal to that of the antenna drive shaft.

The upper contact of the limit position switch 53 and the shoulder 60 on the periphery of the disc 42 constitute signal-developing means coupled to the second control system identified above and effectively responsive to both control effects, namely, the two angular rotations of disc 42, for terminating the second control effect, that is, ending the angular rotation of the disc, and developing at that termination a third control effect representative of a time interval of fixed duration between the center of the received pulse and a time thereafter. This third control effect comprises the potential +B applied to the upper contact of the limit-position switch 53 when the shoulder 60 brings the movable blade or contact of that switch into engagement with the upper contact.

The connection 61, the contact rings 20, and the deflection winding 21 comprise a circuit for applying the third control effect to an indicating device represented as the cathode-ray tube of indicator 15. The line 26 represents the middle of the received pulse and hence the direction of the source radiating the energy which produces the pulse received in receiver 14.

Figure 4:
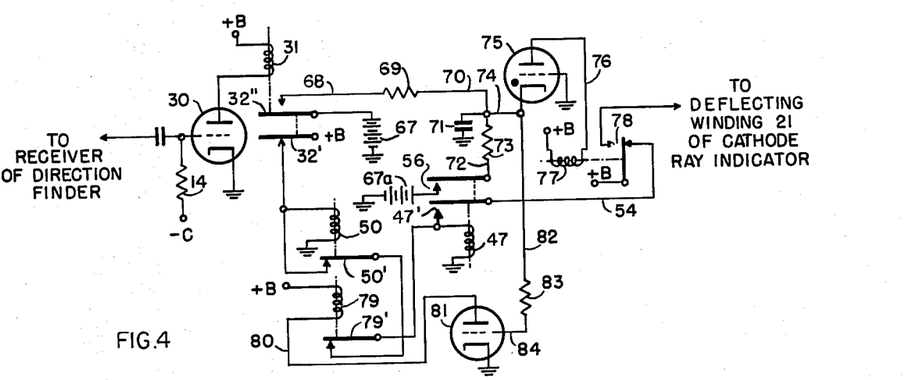

The control apparatus can also be made without mechanically driven, rotating contact parts. A fully electrical arrangement, which functions according to the same principles, is thus indicated in Fig. 4. Corresponding elements are designated by the same reference numerals. The apparatus represented in Fig. 4 is adapted to be connected as indicated to the receiver of the direction finder of Fig. 1 and to the cathode-ray indicator thereof. Thus, in Fig. 4 the same delay 31 is found, which was already described in connection with Fig. 3. When the relay 31 is magnetized, a source 67 of rather high voltage, for instance 200 volts, is connected over its magnetized closed contact 32″ said connection running over the conductor 68, from which the voltage is fed through a resistor 69 and a conductor 70 to a condenser 71, the other terminal of which is connected to ground. The charging of the condenser is thereby started upon the reception of a pulse and its application to tube 30, but the condenser does not obtain such a high charge voltage that there will be any change in operation until the relay 31 is demagnetized. As a consequence of the demagnetization of the relay 31 when the pulse terminates, the relays 50 and 47 are magnetized. The relays 50 and 47 may be connected in the same way as in the arrangement according to Fig. 3, but with a careful adjustment of the relays one may also use the simplified coupling according to Fig. 4. In this, the relay 47 is quicker acting than the relay 50. When the demagnetized closed contact 32′ of the relay 31 is closed after the end of the pulse, the demagnetized closed or normally closed contact 50′ of the relay 50 and the normally closed contact 79′ are momentarily closed, whereby the relay 47 is energized and will acquire a holding voltage at its magnetized closed contact 47′. One moment thereafter the relay 50 is magnetized and opens the contact 50′, but this has no function at present. A magnetized closed contact 56 was however closed when the relay 47 was magnetized. This magnetized closed contact will apply the same positive voltage from a source 67a which may be identical to source 67, for instance 200 volts, to the condenser 71 over the conductor 72, the resistor 73 and the conductor 74, whereby a new charging path for the condenser is completed.

It should hereby be observed that the condenser 71 is first charged through the resistor 69 and thereafter through the resistor 73. The resistor 69 is, however, double the resistance of that of the resistor 73, and consequently the charging speed during the first phase of the charge will be only half of what it is during the second half of the charge. This fully corresponds to the relations in the arrangement according to Fig. 3, in which the disc 42 was rotating during the first part of its movement at only half of the speed it rotated during the second part of the movement of said disc. From this it will be evident that the condenser 71 will get a voltage of such a magnitude, that the thyratron 75, the grid cathode circuit of which is connected between ground and the high voltage terminal of the condenser 71, will become conductive at a moment of time, equal to the mean pulse time, as this was defined above, provided that the thyratron is set for ignition at a voltage which may under no circumstances occur across the electrodes of the condenser 71 during the interval of a random pulse.

The anode discharge current through the thyratron 75 flows over the conductor 76 through the winding of a relay 77 which will over its magnetized closed contact 78 give the indication pulse to the cathode ray valve.

After this pulse has been provided, when the relay 77 has been demagnetized after the tube 75 has deionized, all of the circuits are in their initial position. The holding circuit 54 of the relay 47 runs in this case from a demagnetized closed contact on the relay 77. However, a further relay 79 has been provided which obtains its current from the plus of a source of potential +B terminal through the winding of said relay, the conductor 80, a direct current amplification electronic valve 81 and ground. The electronic valve is controlled over the conductor 82, the protection resistor 83 and the conductor 84 by means of the charging voltage of the condenser 71. The high positive voltage at the source 67 will consequently immediately after the magnetization of the relay 31 provide a current through the condenser 71, whereby its voltage is progressively increasing. After a given time, corresponding to the time angle 65 in Fig. 3, the direct current amplification valve 81 will be conductive and cause a flow of current through the winding of the relay 79, so that this relay is magnetized. It thereby prepares over its magnetized closed contact 79' the working circuit of the relay 47, so that this relay may be magnetized, when the relay 31 is demagnetized at the termination of the pulse applied to tube 30. The arrangement does not respond completely to abnormally short pulses, for instance those caused by random atmospheric disturbances, in the same manner as the arrangement according to Fig. 3 by means of its contact 64.

From the foregoing description of the Fig. 4 embodiment of the invention, it will be seen that the control apparatus for deriving an effect representative of the middle of the duration of a pulse received by a direction finder comprises a first control system, namely, the tube 30, relay 31, source 67, contact 32", conductors 68 and 70, resistor 69, and the condenser 71, which is responsive to the received pulse for deriving at a first predetermined rate established by the resistor 69 a first control effect or potential across the condenser 70 representative of the duration of that pulse. Condenser 71 is charged from source 67 for the duration of the pulse.

The second control system of the Fig. 4 control apparatus, which is coupled to the first control system thereof and is effectively responsive to the trailing edge of the received pulse and derives a second control effect or potential at a rate substantially twice that at which the first control effect is derived, comprises the relay contact 32' and the source +B coupled thereto, the relay contacts 50' and 79', relay 47, and the contact 56 actuated thereby, the source 67a, conductors 72 and 74, resistor 73, the energy-storage device or condenser 71, and the circuit of the thyratron 75. When the received pulse terminates, contact 56 is closed by relay 47 and the condenser 71 is charged through the resistor 73, which has a resistance half that of resistor 69, from the source 67a at a rate twice that when the charging is through the resistor 69.

The movable contact 78 of relay 77, the source +B coupled to the contact, conductor 54, and contact 47' comprise a signal-developing means coupled to the second control system described above and effectively responsive to the control effects developed across condenser 71 for terminating the second control effect (by opening contact 56) and developing at that termination a third control effect (the potential +B for application to the fixed member of contact 78) representative of a time interval of fixed duration between the center of the pulse and a time thereafter.

The conductor for connecting movable contact 78 with the deflecting winding 21 of the cathode-ray indicator 15 comprises a circuit for applying the third control to an indicating device to produce an indication of the middle of the received pulse.

Figure 5:
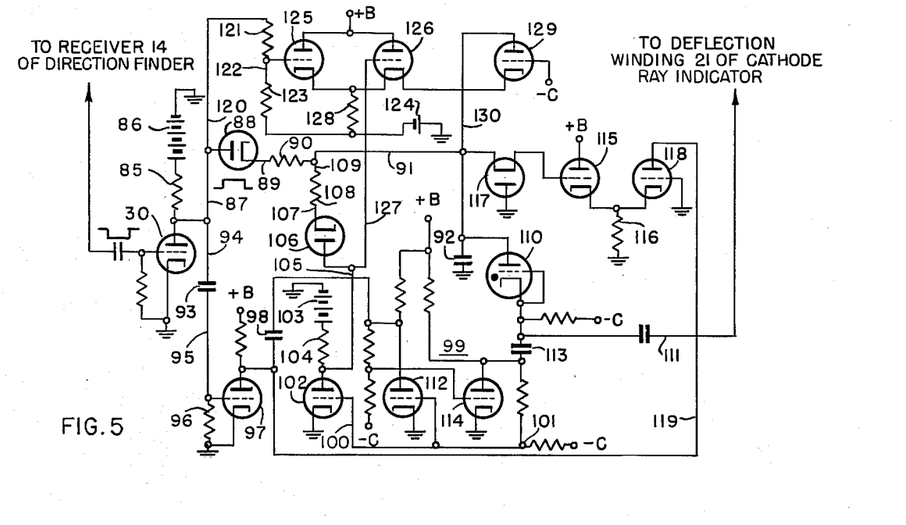

Description of Fig. 5 circuit

Fig. 5 shows another arrangement in which there are no relays, the arrangement operating with electronic control means. The finding pulse is assumed to be of negative polarity and to enter at the grid of the valve 30 as it did in the earlier described embodiments. This valve is normally conductive, and it has therefore a limited internal resistance. The internal resistance of the valve 30 and the external resistance in the resistor unit 85 form a voltage divider, through the function of which the voltage on the anode of the valve 30 is kept at a rather low value. When a pulse is applied to the tube 30, this pulse will, due to the function of the preceding electronic valve in the amplifier, be negative, and consequently the current through the electronic valve 30 is decreased or cut off, that means its internal resistor assumes a high or unlimited value, and the anode voltage increases to the full value of the source of voltage 86 or approximately to this value. At this moment a charging current will start, which will continue as long as the pulse continues. The charging current flows from the source of voltage 86 through the anode resistor 85, the conductor 87, the diode valve 88, the conductor 89, the resistor 90 and the conductor 91 to the condenser 92, which corresponds in function to the condenser 71 in the arrangement according to Fig. 4. The other terminal of the condenser 92 is connected to ground. The circuit just described constitutes a first control system responsive to the output pulse of the receiver of the direction finder for deriving at a predetermined charging rate across condenser 92 a first control effect representative of the duration of that received pulse. Simultaneously, however, also a further condenser 93 has been charged by current from the source of voltage 86 over the resistor 85, the conductor 94, the condenser 93, the conductor 95 and the resistor 96 to ground.

At the termination of the pulse, the charging of the condenser 93 is discontinued, said condenser instead being subjected to a pulse in the opposite direction due to the decreasing voltage on the anode of the valve 30, whereby a positive pulse is provided in the anode circuit of a pulse amplification valve 97. This pulse is transferred over a coupling condenser 98 to a counter according to Eccles-Jordan, indicated as 99. Over the conductor 100 the increasing negative voltage of point 101 is thereby transferred to the grid of a direct current amplifier electronic valve 102. The electronic valve 102 will thereby be rendered nonconductive and take over the function of current controller of the charge of the condenser 92. The charging circuit runs from the positive source of voltage 103 over the anode resistor 104 of the electronic valve 102, the conductor 105, the diode valve 106, the conductor 107, the resistor 108, the conductor 109, the conductor 91 and the condenser 92 to ground. The resistor 90 has a high resistance as compared with the resistor 108, so that the charging resistance of the first mentioned circuit is double that of the last mentioned circuit. The circuits described in this paragraph thus comprise a second control system which is coupled to the first control system and is effectively responsive to the trailing edge of the received pulse for deriving across condenser 92 a second control effect at a rate substantially twice that derived thereacross by current flowing through resistor 90.

Also in this case the condenser 92 is connected to a thyratron. The thyratron valve 110 will consequently be ignited when a given limit voltage on the condenser 92 is obtained, so that a marking pulse will be transferred to the cathode ray indicator over the conductor 111.

The thyratron 110 and its associated circuit then comprises a signal-developing circuit coupled to the second control system including condenser 92 and effectively responsive to the combined durations of the control effects developed thereacross for terminating the second control effect and developing at that termination a third control effect (the potential at the cathode of tube 110 when it is conductive) representative of a time interval of fixed duration between the center of the received pulse and a time thereafter.

It is now assumed, that during the charge of the counter 99 according to Eccles-Jordan the anode of the left valve 112 has been positive. By the pulse, which was transferred to the conductor 111 and which was also, over the condenser 113, transferred to the anode of the right valve 114 in the Eccles-Jordan counter 99, this will now reverse and thereafter the anode in the left valve 112 will be negative, whereas the anode in the right valve 114 will be positive. The reversal of voltage of the anode in the valve 114 causes such a change of voltage in the point 101, that the grid of the valve 102 will get positive and the charge of the condenser 92 will cease. This will thereafter give off its charge to the grid of the electronic valve 115. The cathode of said electronic valve is connected to ground over a resistor 116, so that the cathode will be positive in relation to ground. In the grid conductor of the valve 115 a diode is placed, over which the grid conductor is connected to ground. This diode prevents the potential of the condenser 92 from going negative. As a matter of fact it is important for the correct functioning of the arrangement that the condenser 92 at the correct occurence of the next pulse have an absolutely fixed predetermined voltage, which may in this case be provided for across the diode valve 117.

In addition to its function as a discharge controller, the electronic valve 115 also has to provide that short disturbing random pulses are not allowed to influence the arrangement in such a way that a marking of the indicator is obtained. The high voltage terminal of the resistor 116 is, for this purpose, connected to the cathode of a second electronic valve 118. For the first part of the duration of the pulse, the voltage across the resistor 116 will therefore increase corresponding to the charge of the condenser 92 and, as the grid voltage of the electronic valve 118 is at ground potential, this valve will initially be conductive but its current will successively be decreased, so that the valve 118 after a time, which is shorter than a normal pulse duration, will become nonconductive. Due to the connection 119 between the anodes of the electronic valves 118 and 97, the common anode voltage will be so low during the time when current is still flowing through the valve 118, that no starting of the Eccles-Jordan counter will initially take place. The valve 118 will not be cut off until the condenser 92 has been charged to a value which is lower than its charge at the end of a normal pulse but is greater than the charge which this condenser may obtain due to an accidental atmospheric discharge, or a "false" pulse, and the valve 97 will not start the Eccles-Jordan counter 99 until the set voltage relation has been obtained.

If such a short pulse, that means a "false" pulse, should have influenced the condenser 92, this should as soon as possible be discharged so that it has no remaining rest charge at the moment when a normal pulse is entering. For this purpose the following further arrangement is made:

The anode of the rectifier valve 88 is connected over a conductor 120, a resistor 121, a conductor 122 and a resistor 123 to a source of negative voltage 124. The resistors 121 and 123 function as a voltage divider, and the tapped voltage is applied to the grid of a valve 125 as control voltage. The valve 125 will consequently be controlled by a voltage, which is dependent upon the voltage on the condenser 92. An electronic valve 126, which is connected in parallel with the electronic valve 125 on the cathode as well as on the anode side, has its grid connected over the conductor 127 to the anode of the diode valve 106. Both of the electronic valves 125 and 126 therefore control the presence of a current for charging the condenser 92, the electronic valve 125 controlling the charge for the duration of a normal pulse, whereas the electronic valve 126 controls the charge after the ceasing of the pulse.

The two electronic valves have a common cathode resistor 128. The higher the current is passing through the parallel circuit of the two electronic valves 125, and 126, the more positive the common cathode voltage of the electronic valves will be. This cathode voltage, however, also acts upon a further electronic valve 129, the control grid of which is connected to a fixed, suitable negative voltage. The electronic valve 129 will therefore be nonconductive as long as the condenser 92 is charged, independent of what takes place over one or the other of the two charge circuits, but as soon as the charge ceases, the electronic valve 129 will be conductive and take care of a rapid discharge of the condenser 92 over the anode conductor 130.

Although the precision of an arrangement according to Fig. 5 is very good, the precision can be further improved, if one is not measuring the increasing charge of a condenser, fed with direct current, but instead introduces a control oscillator and by means of an electronic counter counts the number of pulses from the control oscillator. The arrangement should then be of such a kind, that one is first only counting every second control pulse during the duration of the received direction finding pulse, whereas one is thereafter counting all of the control pulses, the function being discontinued for giving up an indication, when a predetermined sum of pulses has been obtained, corresponding to the fixed zero position displacement, which has initially been provided for in the indicator 15 related to the rotating antenna system 10.

Figure 6:
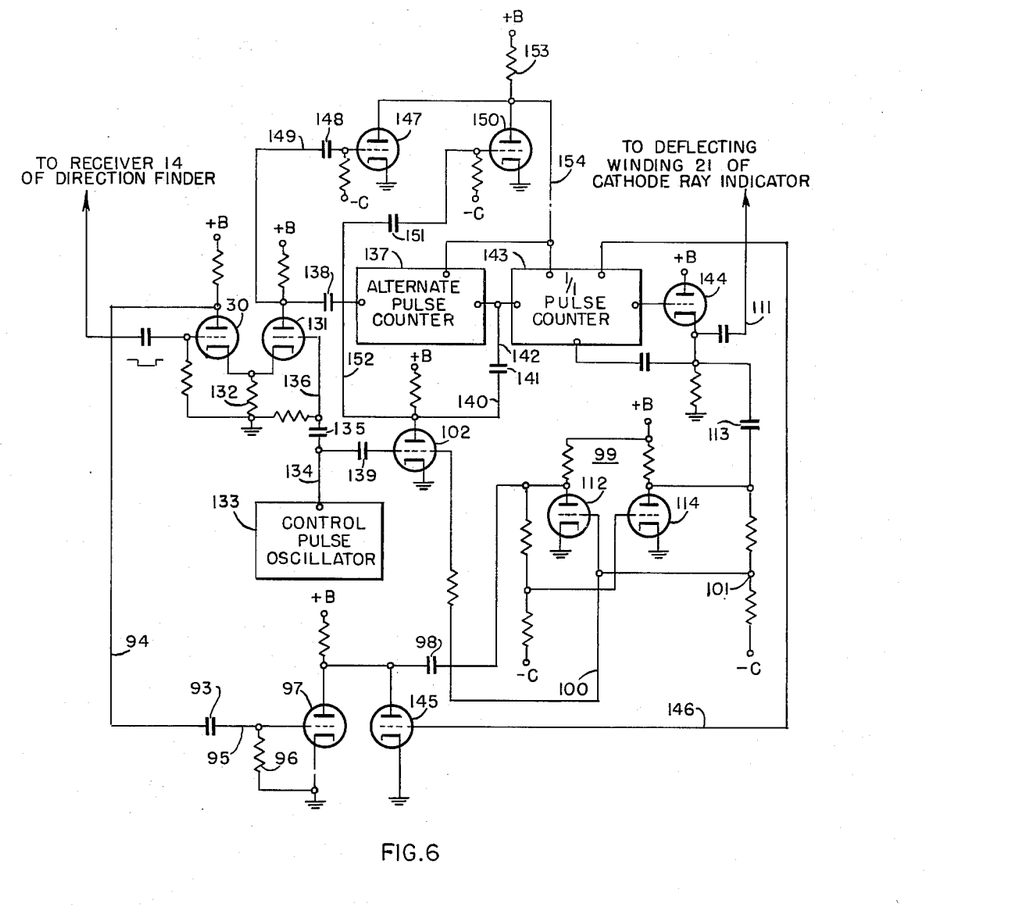

*Description of Fig. 6 circuit*

An arrangement of the last mentioned kind is shown in Fig. 6. The electronic valve controlled by the input direction finding pulse is also indicated 30. In the cathode circuit of this electronic valve and in an electronic valve 131 coupled in parallel therewith on the cathode side, a resistor 132 of such an order of magnitude is introduced that the electronic valve 131 is cut off, when no pulse enters to the electronic valve 30, and consequently the working current of the electronic valve 30 is running through the resistor 132. When a pulse of negative polarity is entering, the current through the electronic valve 30 will, however, decrease or cease, and the decreasing positive bias voltage across the resistor 132 then causes that the electronic valve 131 starts functioning.

A control oscillator 133 is connected over the conductor 134, the condenser 135 and the conductor 136 to a control grid of the electronic valve 131, and during the time of the input pulse from the direction finding receiver, control pulses from the control oscillator will therefore be amplified by the electronic valve 131 and will be transferred to an electronic valve counter 137, which may be made according to Eccles-Jordan. The pulses are transferred by means of a coupling condenser 138. The value of this condenser is so chosen, and the electronic valve counter is working with such a bias voltage on the present electronic valves, that one single pulse from the control oscillator 133 is not sufficient for providing the count of one, but on the other hand, one count is accumulated by the counter after the charge of the condenser 138 by two successive pulses from the control oscillator 133.

The electronic valve 97 has in this connection the same function as in the arrangement according to Fig. 5. Therefore this function will not be described here. It will be sufficient to mention that at the end of the pulse from the direction finding receiver a positive pulse is transferred over the electronic valve 97 to an Eccles-Jordan counter 99, whereby the electronic valve 102 will get such a voltage, that the pulses are thereafter impressed from the control oscillator 133 over the conductor 134 and the coupling condenser 139, further over the electronic valve 102, its anode conductor 140, the coupling condenser 141 and the conductor 142 to the pulse counter 143, which is set in such a way that it counts every pulse from the control oscillator 133.

The circuits of tubes 30 and 131, and the alternate pulse counter 137 may be said to comprise a first control system responsive to the output pulse of the direction-finder receiver and alternate ones of the pulses generated by the control-pulse generator for deriving at a predetermined rate a first control effect in the input circuit of tube 144 representative of the duration of the received pulse. The circuits of tube 102 and the circuits of tubes 97, 112, and 114 which control the operation of tube 102 taken in conjunction with the one-to-one pulse counter 143 comprise a second control system which is coupled to the first control system and is effectively responsive to the trailing edge of the received direction-finding pulse and individual ones of the pulses generated by unit 133 for deriving at a rate substantially twice the aforesaid predetermined rate, a second control effect or potential in the input circuit of tube 144.

After the foreseen number of pulses has in this way been accumulated, the grid of the valve 144 will get positive, and consequently an indication pulse is transmitted over the conductor 111 to the cathode ray indicator.

It is now important that the counters are given no opportunity to accumulate a number of "false" disturbance pulses. For this purpose a specific arrangement is made to prevent the transfer of control pulses over the valve 102 until a sufficient number of successive pulses has been obtained from the valve 131 in order that one shall be sure that it is a question of a real direction finding pulse and not of a "false" pulse. For this purpose an electronic valve 145 is on its anode and cathode sides connected in parallel with the electronic valve 97. The grid of the valve 145 is connected to the counter 143 over the conductor 146.

It is now necessary to mention that counters of the present kind are working in such a way that a given minimum number of pulses, required for the counting function, is accumulated in one way or another, for instance in a condenser, until the charge of the condenser has increased to such a value that a reversal of the polarity of the two electronic valves takes place, for instance the polarity of the two electronic valves 112 and 114 in the counter 99. The capacity of the accumulator means, thus in this case the condenser, is thereby chosen in such a way, that the condenser does not obtain sufficient charge for the counter to enter into function, unless a number of pulses is entering consecutively, which is greater than that which can be assumed to correspond to the longest duration of a "false" direction finding pulse. After the said minimum number of pulses has thus been fed, a reversal of the voltage of the two electronic valves in the counter will be made, and the negative bias voltage on the grid of one valve thereby occurring will be transferred over the conductor 146 to the grid of the electronic valve 145. Thereby this valve is cut off. This enables the counter 99 to function in normal order. As long as the voltage on the grid of the valve 145 is positive, the potential at the anode of the valve 145 is so low, that a starting pulse for the counter 99 cannot be transferred from the valve 97.

If now a number of "false" pulses should have been accumulated, the counters 137 and possibly also 143 must obviously be "put to zero position" before the next following real series of pulses is starting. For that reason an electronic valve 147 is by means of a coupling condenser 148 and the conductor 149 connected to the anode circuit of the valve 131 which transfers control pulses during the duration of the input direction finding pulse, and in a corresponding way a second electronic valve 150 is connected by the coupling condenser 151 and the conductor 152 to the anode circuit of the electronic valve 102, which transfers control pulses during the time after the received direction finding pulse has ceased.

If now both of these electronic valves should not be functioning, that means if the electronic valve 131 should have ceased to transfer such control pulses which are caused during the duration of the received direction finding pulse, without the electronic valve 102 having started to transfer pulses of the kind, which is thereafter accumulated in the counter 143, then the anode current through the anode resistor 153 common to the two electronic valves 147 and 150 will abruptly cease, and a zero positioning pulse will be transferred over the conductor 154 to both of the counters. The conductor 154 is connected to the grid of one alternating current electronic valve contained in each of the counters 137 and 143, respectively, in such a way that this electronic valve is provided with negative grid bias voltage at the pulse transmitted through the conductor 154. Thus, a predetermined electronic valve in each counter will thereby always have a negative bias voltage, when the next following function starts, whereas the other one of the electronic valves will have positive bias voltage.

This invention is of course not limited to the above mentioned forms of execution, shown in connection with the figures in the drawings, but different modifications may be made within the spirit and scope of the invention.

What is claimed is:

1. A control apparatus for deriving an effect representative of the middle of the duration of a pulse which may be unsymmetrical comprising: a first control system responsive to the pulse for deriving at a predetermined rate a first control effect representative of the duration of the pulse; a second control system coupled to said first system and effectively responsive to a portion of the pulse for deriving at a rate substantially greater than said predetermined rate a second control effect; a signal-developing means coupled to said second system and effectively responsive to said control effects for terminating said second control effect and developing at said termination a third control effect representative of a time interval of fixed duration between another portion of the pulse and a time thereafter; and a circuit for applying said third control effect to an indicating device to produce an indication of said middle of the pulse.

2. A control apparatus for deriving an effect representative of the middle of the duration of a pulse comprising: a first control system responsive to the pulse for deriving at a predetermined rate a first control effect representative of the duration of the pulse; a second control system coupled to said first system and effectively responsive to the trailing edge of the pulse for deriving at a rate substantially twice said predetermined rate a second control effect; signal-developing means coupled to said second system and effectively responsive to said control effect for terminating said second control effect and developing at said termination a third control effect representative of a time interval of fixed duration between the center of the pulse and a time thereafter; and a circuit for applying said third control effect to an indicating device to produce an indication of said middle of the pulse.

3. A control apparatus for a direction finder including a rotatable directive antenna, an indicating device operative in synchronism with the antenna rotation, and a receiver for deriving an output pulse at each antenna rotation in response to an unmodulated wave signal radiated from a point comprising: a first control system responsive to the output pulse for deriving at a predetermined rate a first control effect representative of the duration of the output pulse; a second control system coupled to said first system and effectively responsive to the trailing edge of the output pulse for deriving at a rate substantially twice said predetermined rate a second control effect; signal-developing means coupled to said second system and effectively responsive to said control effects for terminating said second control effect and developing at said termination a third control effect representative of a time interval of fixed duration between the center of the output pulse and a time thereafter; and a circuit for applying said third control effect to the indicating device to produce an indication of the direction of the point.

4. A control apparatus for a direction finder including a rotatable directive antenna and a receiver for deriving an output pulse at each antenna rotation in response to an unmodulated wave signal radiated from a point comprising: a first control system responsive to the output pulse for deriving at a predetermined rate a first control effect representative of the duration of the output pulse; a second control system coupled to said first system and effectively responsive to the trailing edge of the output pulse for deriving at a rate substantially twice said predetermined rate a second control effect; a signal-developing means coupled to said second system and effectively responsive to said control effects for terminating said second control effect and developing at said termination a third control effect representative of a time interval of fixed duration between the center of the output pulse and a time thereafter; an indicating device operative in synchronism with the antenna rotation; and a circuit coupled to said indicating device for applying said third control effect thereto to produce an indication of the direction of the point.

5. A control aparatus for a direction finder including a rotatable directive antenna and a receiver for deriving an output pulse at each antenna rotation in response to an unmodulated wave signal radiated from a point comprising: a first control system responsive to the output pulse for deriving at a predetermined rate a first control effect representative of the duration of the output pulse; a second control system coupled to said first system and effectively responsive to the trailing edge of the output pulse for deriving at a rate substantially twice said predetermined rate a second control effect; a signal-developing circuit coupled to said second system and effectively responsive to the combined durations of said control effects for terminating said second control effect and developing at said termination a third control effect representative of a time interval of fixed duration between the center of the output pulse and a time thereafter; a line-tracing device effective to trace a line in synchronism with the antenna rotation; and a circuit coupled to said line-tracing device for applying said third control effect thereto to trace a line indicative of the direction of the point.

6. A direction finder comprising: a rotatable directive antenna; an indicating device operative in synchronism with the antenna rotation; a receiver for deriving an output pulse at each antenna rotation in response to an unmodulated wave signal radiated from a point; a first control system responsive to said output pulse for deriving at a predetermined rate a first control effect representative of the duration of said pulse; a second control system coupled to said first system and effectively responsive to the trailing edge of said pulse for deriving at a rate substantially twice said predetermined rate a second control effect; a signal-developing means coupled to said second system and effectively responsive to the combined durations of said control effects for terminating said second control effect and developing at said termination a third control effect representative of a time interval of fixed duration between the center of said pulse and a time thereafter; and a circuit for applying said third control effect to the indicating device to produce an indication of the direction of the point.

7. A control apparatus for a direction finder including a rotatable directive antenna, an indicating device operative in synchronism with the antenna rotation, and a receiver for deriving an output pulse at each antenna rotation in response to an unmodulated wave signal radiated from a point comprising: a first control system including an energy-storage device responsive to the output pulse for deriving at a predetermined rate a first control effect representative of the duration of the output pulse; a second control system including said energy-storage device coupled to said first system and effectively responsive to the trailing edge of the output pulse for deriving at a rate substantially twice said predetermined rate a second control effect; a signal-developing circuit coupled to said second system and effectively responsive to said control effects for terminating said second control effect and developing at said termination a third control effect representative of a time interval of fixed duration between the center of the output pulse and a time thereafter; and a circuit for applying said third control effect to the indicating device to produce an indication of the direction of the point.

8. A control apparatus for a direction finder including a rotatable directive antenna, an indicating device operative in synchronism with the antenna rotation, and a receiver for deriving an output pulse at each antenna rotation in response to an unmodulated wave signal radiated from a point comprising: a first control system responsive to the output pulse and including a disc rotatable at a predetermined rate through a first angle representative of the duration of the output pulse; a second control system ocupled to said first system and effectively responsive to the trailing edge of the output pulse for rotating said disc through a second angle at a rate substantially twice said predetermined rate; a signal-developing circuit coupled to said second system and effectively responsive to half said first angle and the entire second angle of rotation of said disc for developing a third control effect representative of a time interval of fixed duration between the center of the output pulse and a time thereafter; and a circuit for applying said third control effect to the indicating device to produce an indication of the direction of the point.

9. A control apparatus for a direction finder including a rotatable directive antenna, an indicating device operative in synchronism with the antenna rotation, and a receiver for deriving an output pulse at each antenna rotation in response to an unmodulated wave signal radiated from a point comprising: a first control system including an energy-storage device and a charging path therefor having a predetermined charging time constant and responsive to the output pulse for deriving at a predetermined rate a first control effect representative of the duration of the output pulse; a second control system including said energy-storage device and a charging path therefor having a time constant one-half said predetermined time constant and coupled to said first system and effectively responsive to the trailing edge of the output pulse for deriving at a rate substantially twice said predetermined rate a second control effect; a signal-developing circuit coupled to said second system and effectively responsive to said control effects for terminating said second control effect and developing at said termination a third control effect representative of a time interval of fixed duration between the center of the output pulse and a time thereafter; and a circuit for applying said third control effect to the indicating device to produce an indication of the direction of the point.

10. A control apparatus for a direction finder including a rotatable directive antenna, an indicating device operative in synchronism with the antenna rotation, and a receiver for deriving an output pulse at each antenna rotation in response to an unmodulated wave signal radiated from a point comprising: a first control system including an energy-storage device and a first resistor in the charging path thereof and responsive to the output pulse for deriving at a predetermined rate a first control effect representative of the duration of the output pulse; a second control system including said energy-storage device and a second resistor having a value one-half that of said first resistor and coupled to said first system and effectively responsive to the trailing edge of the output pulse for deriving at a rate substantially twice said predetermined rate a second control effect; a signal-developing circuit coupled to said second system and effectively responsive to said control effects for terminating said second control effect and developing at said termination a third control effect representative of a time interval of fixed duration between the center of the output pulse and a time thereafter; and a circuit for applying said third control effect to the indicating device to produce an indication of the direction of the point.

11. A control apparatus for a direction finder including a rotatable directive antenna, an indicating device operative in synchronism with the antenna rotation, and a receiver for deriving an output pulse at each antenna rotation in response to an unmodulated wave signal radiated from a point comprising: a generator for producing pulses having a periodicity much greater than the duration of the output pulse; a first control system including a pulse counter responsive to the output pulse and alternate ones of said generated pulses for deriving at a predetermined rate a first control effect representative of the duration of the output pulse; a second control system including a pulse counter coupled to said first system and effectively responsive to the trailing edge of the output pulse and individual ones of said generated pulses for deriving at a rate substantially twice said predetermined rate a second control effect; signal-developing means coupled to said second system and effectively responsive to said control effects for terminating said second control effect and developing at said termination a third control effect representative of a time interval of fixed duration between the center of the output pulse and a time thereafter; and a circuit for applying said third control effect to the indicating device to produce an indication of the direction of the point.

12. A control apparatus for a direction finder including a rotatable directive antenna and a receiver for deriving an output pulse at each antenna rotation in response to an unmodulated wave signal radiated from a point comprising: a first control system responsive to the output pulse for deriving at a predetermined rate a first control effect representative of the duration of the output pulse; a second control system coupled to said first system and effectively responsive to the trailing edge of the output pulse for deriving at a rate substantially twice said predetermined rate a second control effect; a signal-developing circuit coupled to said second system and effectively responsive to the combined durations of said control effects for terminating said second control effect and developing at said termination a third control effect representative of a time interval of fixed duration between the center of the output pulse and a time thereafter; a cathode-ray line-tracing device including deflecting means rotatable in synchronism with the antenna rotation and effective to trace a line in synchronism with the antenna rotation; and a circuit including an auxiliary deflecting means coupled to said line-tracing device for applying said third control effect thereto to trace a line indicative of the direction of the point.

References Cited in the file of this patent

UNITED STATES PATENTS

| | | |
|---|---|---|
| 2,427,905 | Fyler | Sept. 23, 1947 |
| 2,440,268 | Hardy | Apr. 27, 1948 |
| 2,468,063 | Hardy | Apr. 26, 1949 |
| 2,475,612 | Hansel | July 12, 1949 |
| 2,502,448 | Frum | Apr. 4, 1950 |
| 2,531,467 | Reade | Nov. 28, 1950 |